United States Patent [19]

Holtman

[11] Patent Number: 4,640,409
[45] Date of Patent: Feb. 3, 1987

[54] CONVEYOR FOR SHEET MATERIAL

[75] Inventor: Lodewijk T. Holtman, Tegelen, Netherlands

[73] Assignee: Océ-Nederland B.V., Venlo, Netherlands

[21] Appl. No.: 610,910

[22] Filed: May 16, 1984

[30] Foreign Application Priority Data

May 31, 1983 [NL] Netherlands .......................... 8301915

[51] Int. Cl.⁴ ...................... B65G 29/00; B65G 37/00
[52] U.S. Cl. .................................... 198/624; 198/789; 271/272
[58] Field of Search ............... 198/575, 576, 624, 781, 198/789, 790; 271/272, 273, 274, 314

[56] References Cited

U.S. PATENT DOCUMENTS

| 2,199,270 | 4/1940 | Roselius . | |
| 2,988,356 | 6/1961 | Maier | 271/272 X |
| 3,502,197 | 3/1970 | Kato et al. | 198/781 |
| 3,516,656 | 6/1970 | Sherman | 271/272 X |
| 3,618,934 | 11/1971 | Germuska | 271/274 |
| 3,622,059 | 11/1971 | Sarela | 271/272 X |
| 4,316,606 | 2/1982 | Buys et al. | 271/10 |

FOREIGN PATENT DOCUMENTS

| 2026745 | 12/1971 | Fed. Rep. of Germany | 198/624 |
| 1305022 | 10/1962 | France | 271/314 |

Primary Examiner—Joseph E. Valenza
Assistant Examiner—Lyle Kimms
Attorney, Agent, or Firm—Albert C. Johnston

[57] ABSTRACT

In a conveyor device for conveying sheet material in sheet or web form, two pairs of conveyor rollers are spaced apart with their axes parallel to one another, each pair including a deformable roller cooperating with a substantially non-deformable conveyor roller, and the two pairs of rollers are driven by a non-deformable drive roller which is mounted for rotation about a fixed axis disposed between them, with the deformable conveyor roller of each pair pressed against its cooperating non-deformable conveyor roller and also against the drive roller so that compensating differences of peripheral speed occur at the two pressure nips of each deformable conveyor roller. Each deformable roller is pressed in a direction located in or at least proximate to the plane of the bisector of the dihedral angle between a plane through the axes of the drive roller and the deformable roller and a plane through the axes of the deformable roller and its cooperating non-deformable conveyor roller. As a result, the speed of conveyance by the pairs of rollers is not changed by variations of the pressure applied or of the hardness of the roller surfaces and is practically independent of the diameters of the rollers.

6 Claims, 3 Drawing Figures

CONVEYOR FOR SHEET MATERIAL

This invention relates to a conveyor device for conveying sheet material in sheet or web form.

In a well known kind of such conveyor devices, two pairs of conveyor rollers are disposed with their axes parallel to one another, and each pair comprises two cooperating conveyor rollers which are pressed one against another, one roller of each pair being deformable and the other substantially non-deformable.

Conveyor devices of that kind can be used for many sheet conveying applications. In certain uses, however, such as for conveying originals or a light-sensitive element along the exposure station of a copying machine, these known conveyor devices do not operate satisfactorily. They do not because, due to small differences in speed which occur between the pairs of conveyor rollers located ahead of and after the exposure station, the image formed there undergoes deformation to an appreciable degree.

U.S. Pat. No. 3,245,311 discloses a conveyor device in which pairs of conveyor rollers located before and after an exposure station are interconnected by rubber belts extending over a roller of each of the pairs. In this way, although the same superficial speed is to be expected in the nips between the pairs of rollers, differences do occur in respect of the speed of conveyance of a sheet. Also, the common drive of pairs of rollers by means of a belt involves variations of the speed difference as a result of belt stretch.

It has been found that such speed differences are attributable particularly to the use of deformable rollers in the roller pairs. Deformable rollers provided with relatively soft covering layers made of materials such as plastics and rubber are used in order to increase the frictional properties of the rollers. The speed of conveyance of a material in sheet or web form between a pair of rollers is affected by the degree of deformation occurring in one or both of the rollers in the nip between the rollers. The degree of deformation is in turn dependent upon the hardness of the surface of the rollers used, the diameter of the rollers, and the pressure exerted on the rollers. Even when apparently identical pairs of rollers are used, there will be a difference in speed of conveyance between the pairs of rollers, because, within normal manufacturing tolerances, the several rollers will differ in respect of properties of the deformable material used, the roller diameter, and the spring constant of the roller pressing means, typically a resilient element, which is used to press the rollers one against another. Further, the deformable rollers wear differently during use, so that the difference in speed of conveyance ultimately varies for this reason.

According to the present invention, in an apparatus or device making use of two pairs of conveyor rollers for conveying sheet material along a transport path, with each pair of rollers comprising a deformable roller and a cooperating substantially non-deformable roller, a common drive means is provided for driving the two pairs of rollers, which means comprises a substantially non-deformable drive roller that is rotated in contact with the deformable conveyor roller of each pair, and roller pressing means are provided which press the deformable conveyor roller of each pair against the associated conveyor roller and also press it against the drive roller so that, although deformations occur at the two nips of each deformable roller, substantially compensating changes of peripheral speed result at these nips and the non-deformable conveyor rollers are kept at an identical or nearly identical peripheral speed. To this end, the pressing of each deformable roller is effected in a direction located in or at least proximate to the plane of the bisector of the dihedral angle defined by a plane through the axes of the drive roller and the deformable conveyor roller and a plane through the axes of the deformable conveyor roller and the associated non-deformable conveyor roller.

By the expression "substantially non-deformable roller" is meant not only a single roller but also a plurality of rollers disposed coaxially, i.e., with their axes in extension of one another.

The speed of conveyance of sheet material by the pairs of rollers in a conveyor device according to the present invention is not changed by variations of the pressure applied to the rollers or variations of the surface hardness of the rollers used, and is practically independent of the roller diameters. The speed of conveyance is affected by the direction in which the pressure is applied, but this can generally be set sufficiently exactly relative to the plane of the bisector; although it desirably is located in that plane, the pressing direction can deviate a few degrees from the plane of the bisector without resultant difficulty.

The above mentioned and other features and advantages of the invention will be further evident from the following detailed description and the accompanying drawing of illustrative embodiments of the invention. In the drawing.

Figure 1:
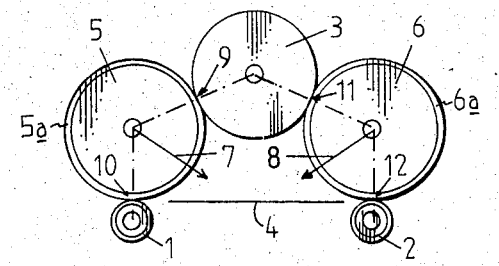
FIG. 1 is a diagrammatic end view showing the rollers and directions of pressing forces in a conveyor device embodying the invention.

In the embodiment shown diagrammatically in FIG. 1, a steel drive roller 3 of relatively large diameter is disposed above a platen 4 of a copying machine (not shown). Steel conveyor rollers 1 and 2 of relatively small diameter are disposed respectively at opposite sides of the platen. A conveyor roller 5 having a rubber covering layer 5a is pressed against rollers 1 and 3, and a similar conveyor roller 6, rubber covered by layer 6a, is pressed against rollers 2 and 3.

The direction of the pressing force on conveyor roller 5 is indicated by arrow 7, and the direction of the pressing force on conveyor roller 6 is indicated by arrow 8. The direction of arrow 7 coincides with the bisector of the angle between the line connecting the axes of the rollers 3 and 5 and the line connecting the axes of the rollers 1 and 5. The direction of arrow 8 coincides with the bisector of the angle between the line connecting the axes of the rollers 3 and 6 and the line connecting the axes of the rollers 2 and 6. These bisectors and connecting lines of course represent planes perpendicular to the plane of the drawing.

The direction of the pressing force indicated by arrow 7 is such that the pressure in the nip 9 between the drive roller 3 and conveyor roller 5 is kept substantially equal to the pressure in the nip 10 between the conveyor rollers 5 and 1. The deformable conveyor roller 5, as a result of being deformed by pressure in the nip 9, has a somewhat lower circumferential speed than the drive roller 3; but since the conveyor roller 5 is again deformed by a substantially equal pressure in the nip 10, the circumferential speed of conveyor roller 1 in nip 10 is somewhat greater than that of conveyor roller 5. If rollers 1 and 3 were to have the same diameter, the deformations in the nips 9 and 10 would be completely the same and there would be complete compensation of the decelerations so that the circumferential speed of the conveyor roller 1 would be completely identical to that of the drive roller 3.

In the same way, given identical diameters for rollers 3 and 2, the direction of the pressing force applied to the deformable conveyor roller 6 as indicated by arrow 8 will result in the circumferential speed of conveyor roller 2 being equal to that of drive roller 3 and hence also equal to that of conveyor roller 1. In such a case the degree of deformation of the rubber layers 5a and 6a of the conveyor rollers 5 and 6 in the respective nips of these rollers is completely immaterial, as are also deformation-influencing parameters such as the magnitude of the forces acting on the rollers.

In an embodiment of the invention as illustrated in FIG. 1, since the conveyor rollers 1 and 2 have a smaller diameter than the drive roller 3, the speed compensation is not complete and it is possible for a difference in deformation at the two nips of each deformable conveyor roller to continue to play a part; but the influence of such a difference on the circumferential speed of the conveyor rollers 1 and 2 is much less than in the pairs of rollers of the previously known conveyor devices.

Figures 2, 3:
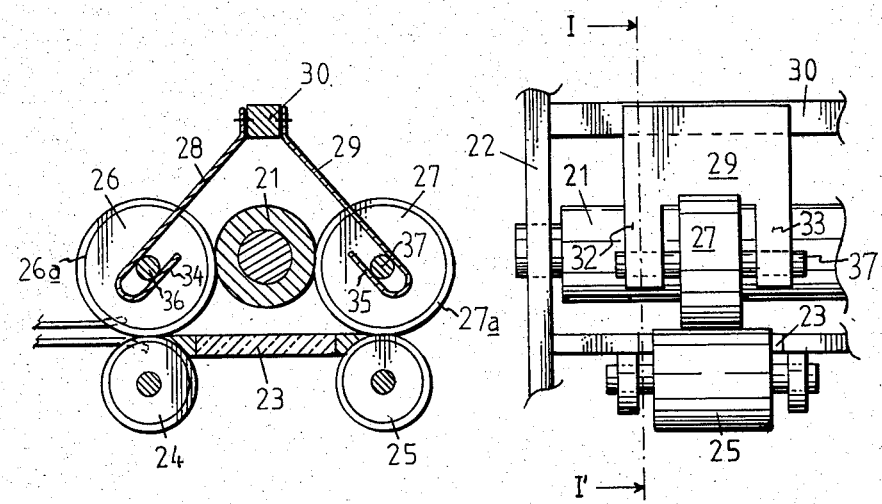
FIG. 2 is a more detailed elevational view of another embodiment of the invention.
FIG. 3 is a cross section taken along the line I—I' in FIG. 2.

In the embodiment of the invention illustrated in FIGS. 2 and 3, the degree to which the rubber-covered conveyor rollers undergo deformation is quite immaterial.

In this embodiment, the conveyor device comprises a metal drive roller 21 mounted between two frame plates 22 so as to rotate about a fixed axis. Only one of the frame plates is illustrated in FIG. 2. A glass strip 23 is mounted beneath the metal drive roller 21, again between the two frame plates, with its longer sides extending parallel to the axis of the metal drive roller 21. This glass strip forms an exposure slot of a copying machine (not further shown).

Rows of steel conveyor rollers 24 and 25 respectively are provided at opposite sides of the glass strip 23, with the roller axes parallel to the longer sides of the glass strip and with the axes of the rollers in each row aligned in extension of one another. FIG. 2 shows only one roller 25 of the rows of conveyor rollers, the diameter of which is equal to that of drive roller 21.

Disposed over and in contact with rollers 24 and 25 of the two rows are conveyor rollers 26 and 27 which have elastically deformable covering layers 26a and 27a made of rubber or like material. One of these deformable rollers is pressed into each of the spaces between the drive roller 21 and the conveyor rollers 24 and 25, respectively, by means of leaf-springs 28 and 29 respectively. One end of each leafspring is secured to a supporting bar 30 mounted between the frame plates 22. The other end of each of the leafsprings 28 and 29 terminates in two lips 32 and 33 which straddle a rubber-covered conveyor roller 26 or 27, being disposed at opposite sides thereof, and have respective end portions 34 and 35 bent back over and lying parallel to the lips so as to form channels which contain the axle 36 or 37 of the related roller 26 or 27. The leafsprings, by acting at their lips against the axles, press the rubber-covered conveyor rollers 26 and 27 respectively against the drive roller 21 and against the associated steel conveyor rollers 24 and 25, respectively, in directions which respectively are substantially perpendicular to the planes between the axes of the rollers 24 and 25 and the axis of the drive roller 21, because each of the leafsprings is mounted parallel to the corresponding one of said planes.

Although only one each of the rubber-covered rollers 26 and 27 is shown in the drawing, these rollers too are disposed in two rows with their respective axes parallel to the longer sides of the glass strip 23 and the rollers of each row are situated approximately coaxially, each as an extension of another within a row.

I claim:

1. A conveyor for conveying sheet material in sheet or web form, comprising two pairs of conveyor rollers disposed with their axes parallel to one another, each pair comprising a displaceable deformable conveyor roller and a cooperating substantially non-deformable conveyor roller; a substantially non-deformable drive roller operable to drive said pairs of rollers, said drive roller being mounted for rotation on a fixed axis intermediate said pairs of rollers; and means for pressing each of said deformable rollers in peripheral frictional driving relation against its cooperating non-deformable conveyor roller and in peripherial frictional driven relation against said drive roller so that at the corresponding nips of each said deformable roller deformations thereof cause substantially compensating changes of peripheral speed to keep said non-deformable conveyor rollers at an at least nearly identical peripheral speed.

2. A conveyor according to claim 1, said pressing means comprising for each said deformable roller means acting to press the deformable roller in a direction located in or proximate to the plane of the bisector of the dihedral angle defined by a plane through the axes of said drive roller and the deformable roller and a plane through the axes of the deformable roller and its cooperating non-deformable conveyor roller.

3. A conveyor according to claim 1, each said deformable roller being rotatable on an axle displaceable laterally relative to the cooperating non-deformable conveyor roller and said drive roller, said pressing means comprising for each said deformable roller a leaf spring having end portions disposed at opposite sides of the deformable roller and bearing against the axle thereof so as to press the deformable roller in a direction substantially perpendicular to a plane between the respective axes of the cooperating non-deformable conveyor roller and the drive roller.

4. A conveyor according to claim 1, the respective diameters of said drive roller and said non-deformable conveyor rollers being substantially identical whereby their respective peripheral speeds are kept substantially identical.

5. A conveyor according to claim 2, the respective diameters of said drive roller and said non-deformable conveyor rollers being substantially identical whereby their respective peripheral speeds are kept substantially identical.

6. A conveyor according to claim 3, the respective diameters of said drive roller and said non-deformable conveyor rollers being substantially identical whereby their respective peripheral speeds are kept substantially identical.

* * * * *